US012551857B2

(12) United States Patent
Cohen et al.

(10) Patent No.: US 12,551,857 B2
(45) Date of Patent: Feb. 17, 2026

(54) CARBONATION MACHINE AND METHOD FOR CARBONATING VARIOUS LIQUIDS

(71) Applicant: Sodastream Industries Ltd., Kfar Saba (IL)

(72) Inventors: Avi Cohen, Tel-Aviv (IL); Oren David Shalev, Ashdod (IL); Dalit Bahar, Raanana (IL); Dvir Brand, Hod Hashron (IL); Gal Shner, Kohav Michael (IL); Igor Kurovets, Shoham (IL)

(73) Assignee: Sodastream Industries Ltd., Kfar saba (IL)

( * ) Notice: Subject to any disclaimer, the term of this patent is extended or adjusted under 35 U.S.C. 154(b) by 344 days.

(21) Appl. No.: 18/142,592

(22) Filed: May 3, 2023

(65) Prior Publication Data

US 2024/0367117 A1    Nov. 7, 2024

(51) Int. Cl.
*B01F 23/2361* (2022.01)
*B01F 23/23* (2022.01)
*B01F 23/233* (2022.01)
*B01F 23/236* (2022.01)
*B01F 23/237* (2022.01)

(52) U.S. Cl.
CPC ...... *B01F 23/23611* (2022.01); *B01F 23/233* (2022.01); *B01F 23/2363* (2022.01); *B01F 23/2364* (2022.01); *B01F 23/2366* (2022.01); *B01F 23/237621* (2022.01)

(58) Field of Classification Search
CPC .............. B01F 23/233; B01F 23/23611; B01F 23/2363; B01F 23/2364; B01F 23/2366; B01F 23/237621
USPC ...................................................... 261/DIG. 7
See application file for complete search history.

(56) References Cited

U.S. PATENT DOCUMENTS

| 5,531,254 A * | 7/1996 | Rosenbach ............... A23L 2/54 |
| | | 261/DIG. 7 |
| 9,302,229 B2 * | 4/2016 | Leung .................. B01F 23/2361 |
| 9,427,712 B2 | 8/2016 | Ring et al. |
| 10,058,826 B2 * | 8/2018 | Cohen ........................ A23L 2/54 |
| 12,290,789 B2 * | 5/2025 | Baudtler ............. B01F 23/2361 |

FOREIGN PATENT DOCUMENTS

WO    WO 2015/144639 A1  * 10/2015
WO    WO 2021175876        9/2021

* cited by examiner

*Primary Examiner* — Charles S Bushey
(74) *Attorney, Agent, or Firm* — Sterne, Kessler, Goldstein & Fox P.L.L.C.

(57) ABSTRACT

A carbonation machine includes a carbonation head to sealingly couple to a bottle filled with liquid to be carbonated; a piping to introduce and compress carbon dioxide into a space within the bottle above a top surface of the liquid to a predetermined pressure level when the bottle is coupled to the carbonation head; a stirrer to stir the liquid to enhance absorption of carbon dioxide in the liquid when the bottle is coupled to the carbonation head; and a manually operated valve mechanism configured to be moved to any position between a closed position to an open position for user-controlled release of pressure within the space.

19 Claims, 10 Drawing Sheets

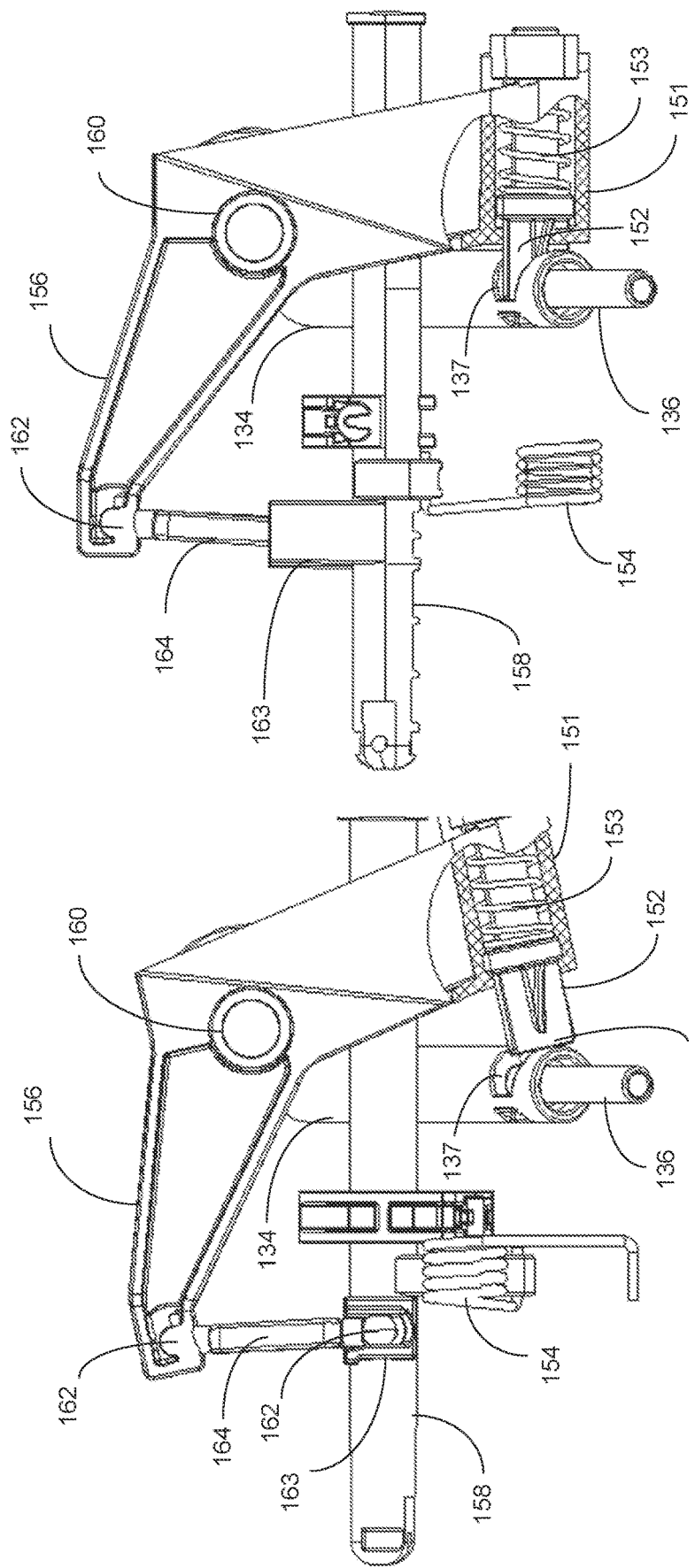

CARBONATION MACHINE AND METHOD FOR CARBONATING VARIOUS LIQUIDS

FIELD OF THE INVENTION

The present invention relates to carbonation machines. More particularly, the present invention relates to a carbonation machine and method for carbonating various liquids, aimed at facilitating carbonation of various liquids other than just pure water.

BACKGROUND OF THE INVENTION

Carbonation machines are commonly used in homes, offices, cafeterias, and other settings.

Typically, a carbonation machine is designed to carbonate water or other liquid that is in a bottle that is sealingly attached to the carbonation head of the carbonation machine to prevent inadvertent pressure release from the bottle. In the carbonation process carbon dioxide is injected as a jet (in a typical pressure of some 60 bars) into the water to obtain a sparkling beverage. The injected carbon dioxide creates turbulence in the bottle allowing good distribution and absorption of carbon dioxide in the water, while excess gas is released. Pressure built-up above the water surface inside the bottle may typically be released via designated one or more pressure release valves. When the carbonation process is over the bottle with the carbonated beverage may be removed from the carbonation head of the carbonation machine. Typically, the removal of the bottle from the carbonation head is carried out by tilting the bottle to actuate a pressure release mechanism or another arrangement for quick release of gas to release excess pressure from within the bottle. The release of excess gas during the removal of the bottle from the carbonation machine is usually uncontrolled.

Carbonating liquid other than pure water (e.g., milk, fruit juice, water with an additive or additives, such as sugar, syrup, pulp etc.) may entail safety problems, as the additive may hamper the proper operation of safety valves, for example by sticking or otherwise preventing parts of pressure release valves from successfully venting away excess pressure. Furthermore, liquids who's composition is different from pure water (e.g., due to the existence of additives or any additional constituents in water) may result in excessive frothing, that may erupt from the bottle, when disconnecting the bottle from the carbonation head of the carbonation machine, causing mess and inconvenience.

It may be, therefore, desired to provide a carbonation machine that is designed for carbonating various liquids, such as milk, fruit or vegetable juices, water with sugar and other additives, etc, which is designed to overcome the abovementioned shortcomings associated with known carbonation machines.

SUMMARY OF THE INVENTION

There is thus provided, in accordance with an embodiment of the invention, a carbonation machine that includes a carbonation head to sealingly couple to a bottle filled with liquid to be carbonated. The carbonation machine also includes a piping to introduce and transfer carbon dioxide into a space within the bottle above a top surface of the liquid to a predetermined pressure level when the bottle is coupled to the carbonation head. The carbonation machine also includes a stirrer to stir the liquid to enhance absorption of carbon dioxide in the liquid when the bottle is coupled to the carbonation head; and the carbonation machine also includes a manually operated valve mechanism configured to be moved to any position between a closed position to an open position for user-controlled release of pressure within the space.

According to some embodiments of the present invention, the manually operated valve mechanism comprises a pinch valve mechanism.

According to some embodiments of the present invention, the pinch valve mechanism comprises a pinch bumper to pinch a drain tube to prevent flow through the drain tube when in the closed position, and to retract from the drain tube to allow flow through the drain tube to release pressure inside the bottle.

According to some embodiments of the present invention, the pinch valve mechanism is configured to allow gradual retracting of the pinch bumper to release pressure through the drain tube.

According to some embodiments of the present invention, the pinch bumper is held at an end of a seesaw arm pivotally supported by an axis mount.

According to some embodiments of the present invention, the pinch bumper is held by a receptacle.

According to some embodiments of the present invention, the pinch bumper is maintained in a default extended outwards position.

According to some embodiments of the present invention, the pinch bumper is maintained in a default extended outwards position by a preloaded spring.

According to some embodiments of the present invention, the preloaded spring is configured to yield to overpressure buildup inside the bottle above a predetermined overpressure threshold.

According to some embodiments of the present invention, the pinch valve mechanism includes a friction generator to generate friction so as to allow manually operating the manually operated valve mechanism to any position between the closed position and the open position and maintaining that position even when the manually operated valve mechanism is released.

According to some embodiments of the present invention, the pinch valve mechanism is operable by a pinch valve lever.

According to some embodiments of the present invention, the pinch valve lever is substantially orthogonally coupled to a rotatable axle.

According to some embodiments of the present invention, the pinch valve mechanism comprises an over-center spring positioned such that when the pinch valve mechanism approaches either the closed position or the open position, the over-center spring exerts a rotary force on an axle of the pinch valve mechanism so as to force the axle to rotate to a nearest end position, to affect either the closed position or the open position.

According to some embodiments of the present invention, the stirrer is electrically operated.

According to some embodiments of the present invention, the carbonation head is configured to transfer the carbon dioxide in the space up to a pressure threshold.

According to some embodiments of the present invention, the pressure threshold is 10 bars.

According to some embodiments of the present invention, the pressure threshold is 6 bars.

According to some embodiments of the present invention, parts of the machine that are designed to be placed in contact with the liquid are removable.

According to some embodiments of the present invention, the carbonation machine may further include a controller, configured to cause carbon dioxide to be added to the space within the bottle above the top surface of the liquid when pressure in the bottle drops below a predetermined pressure threshold.

According to some embodiments of the present invention, there is provided a method for carbonating liquid. The method includes sealingly coupling a bottle filled with liquid to be carbonated to a carbonation head of a carbonation machine. The method also includes transferring carbon dioxide through a piping into a space within the bottle above a top surface of the liquid to a predetermined pressure level when the bottle is coupled to the carbonation head. The method also includes stirring the liquid by a stirrer to enhance absorption of carbon dioxide in the liquid when the bottle is coupled to the carbonation head and manually operating a valve mechanism configured to be moved to any position between a closed position to an open position for user-controlled release of pressure within the space.

BRIEF DESCRIPTION OF THE DRAWINGS

In order for the present invention to be better understood and for its practical applications to be appreciated, the following Figures are provided and referenced hereinafter. It should be noted that the Figures are given as examples only and in no way limit the scope of the invention. Like components are denoted by like reference numerals.

FIG. 8A shows the pinch valve mechanism of FIG. 7 with the drain tube open.

FIG. 8B shows the pinch valve mechanism of FIG. 7 with the drain tube closed.

DETAILED DESCRIPTION OF THE INVENTION

Figure 1:
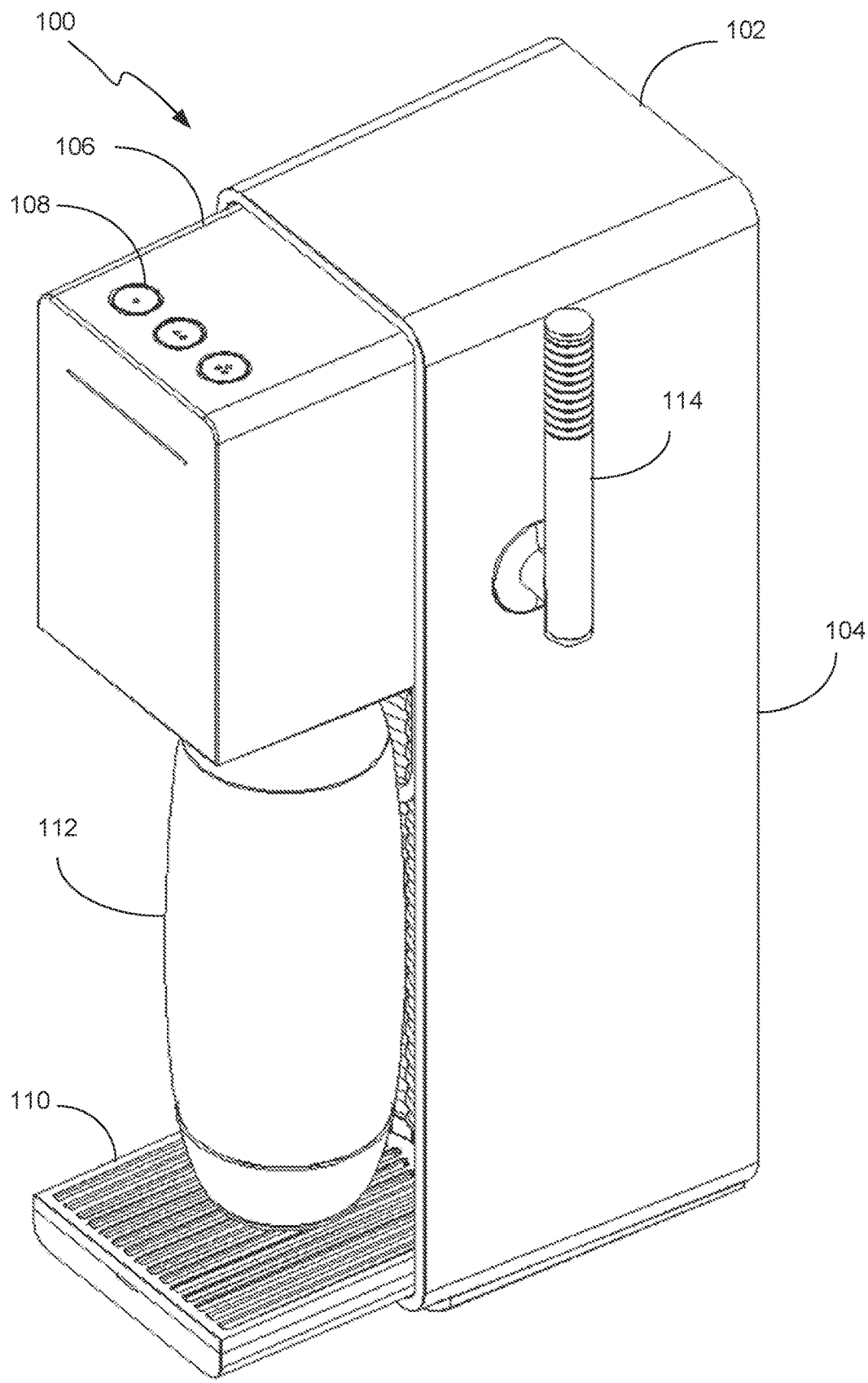
FIG. 1 is an isometric view of a carbonation machine, according to some embodiments of the present invention, with a carbonation bottle attached to the carbonation head.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing." "computing," "calculating." "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

According to some embodiments of the present invention, a carbonation machine is provided, designed for carbonating liquid other than pure water (e.g., milk, fruit juice, water with an additive or additives, such as sugar, syrup, pulp etc.). Such carbonation machine is designed to direct carbon dioxide into the space in the carbonation bottle above the liquid top surface and compress the carbon dioxide to a pressure level of up to 10 bars, e.g., 6 bars, and use a stirrer to stir the liquid to enhance the absorption of the carbon dioxide in the liquid. During the absorption of carbon dioxide in the liquid pressure above the liquid may drop. A pressure sensor may detect the carbon dioxide pressure drop and the controller (107, FIG. 9) may actuate the carbonation mechanism of the carbonation machine to release additional carbon dioxide into the space inside the carbonation bottle, above the liquid top surface to maintain a proper pressure level of the carbon dioxide. According to some embodiments, the controller may be configured to cause carbon dioxide to be added to the space within the bottle above the top surface of the liquid when pressure in the bottle drops below a predetermined pressure threshold.

There are typically two ways to properly carbonate a liquid. One way typically involves increasing the pressure to 12 bar without releasing pressure and the other way involves pressurizing to 6 to 8 bar and allowing gas to flow through the water using the turbulence being caused by the flow to enhance the carbonation level. In a carbonation machine according to some embodiments of the invention, the generated turbulence with the stirrer increases the absorption of $CO_2$ in the water without the need to pass large quantities of gas through the water to create the turbulence.

According to some embodiments of the present invention, when the carbonation process is completed, remaining excess pressure within the carbonation bottle may be decompressed in a controlled manner using a pinch valve mechanism, allowing a user total control over the pressure release. The pinch valve mechanism allows the user to carefully vent excess gas out of the bottle by carefully turning the pinch valve mechanism to an open state, and manually stop the venting process if froth begins to spill out of the bottle.

The bottle with the carbonated liquid may be removed safely from the carbonation machine after the decompression is completed.

FIG. 1 is an isometric view of a carbonation machine 100, according to some embodiments of the present invention, with a carbonation bottle attached to the carbonation head.

Figure 2:
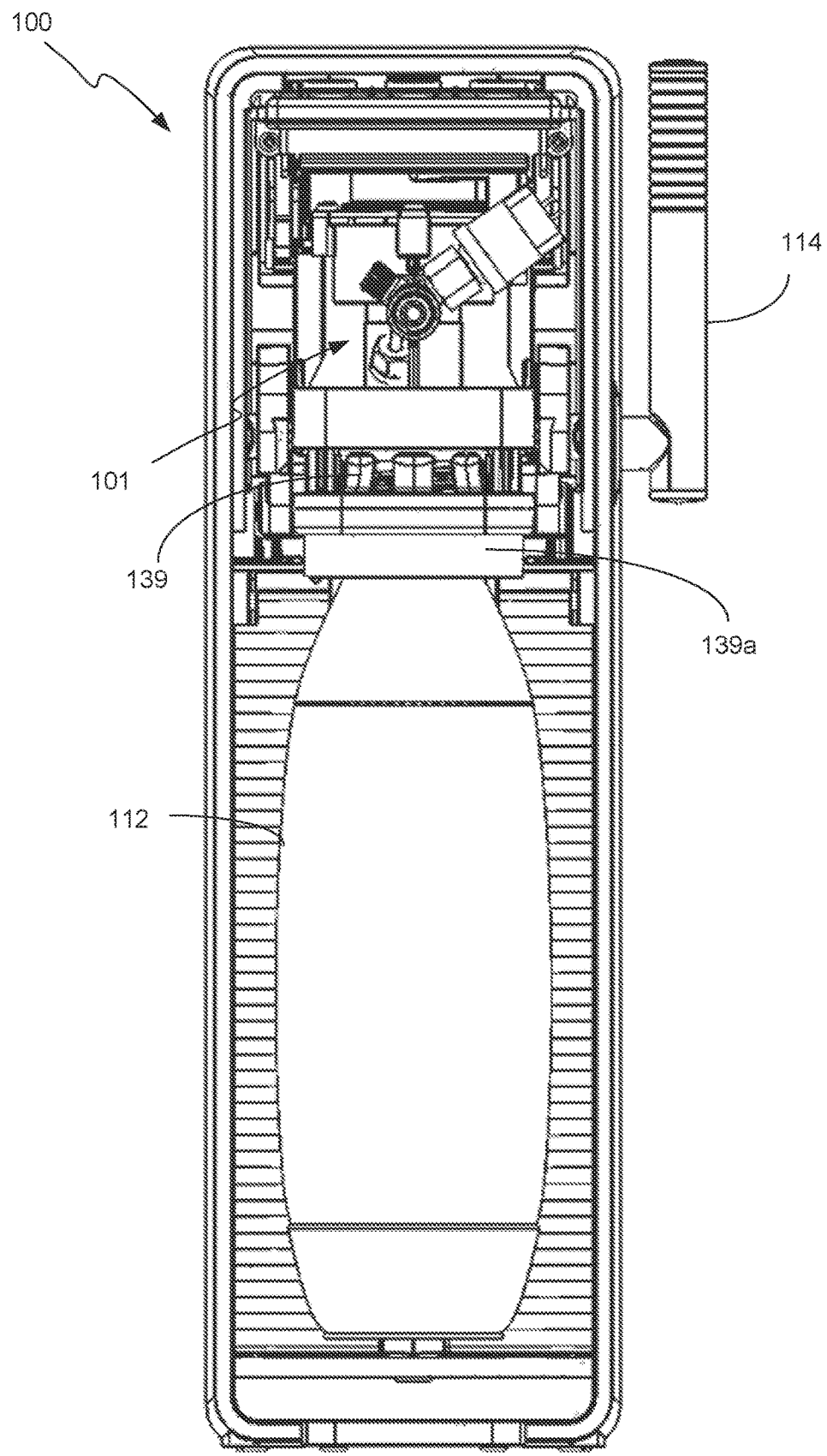
FIG. 2 is a frontal view of the carbonation machine of FIG. 1, exposing internal parts of the carbonation head.

FIG. 2 is a frontal view of the carbonation machine of FIG. 1, exposing internal parts of the carbonation head.

Figure 3:
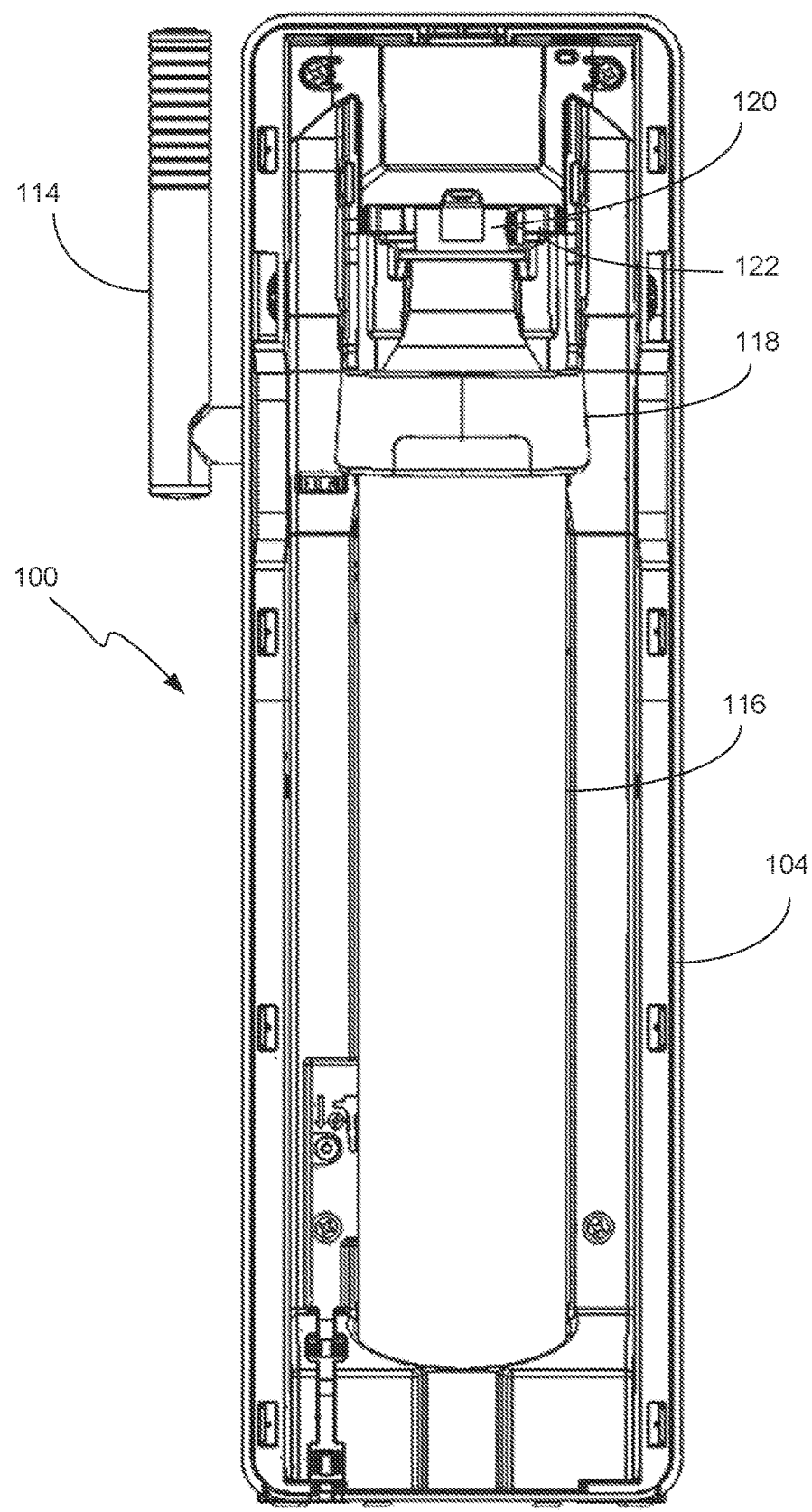
FIG. 3 is a back view of the carbonation machine of FIG. 1, showing a gas canister connected inside the gas canister compartment.

FIG. 3 is a back view of the carbonation machine of FIG. 1, showing a gas canister connected inside the gas canister compartment.

Figure 5:
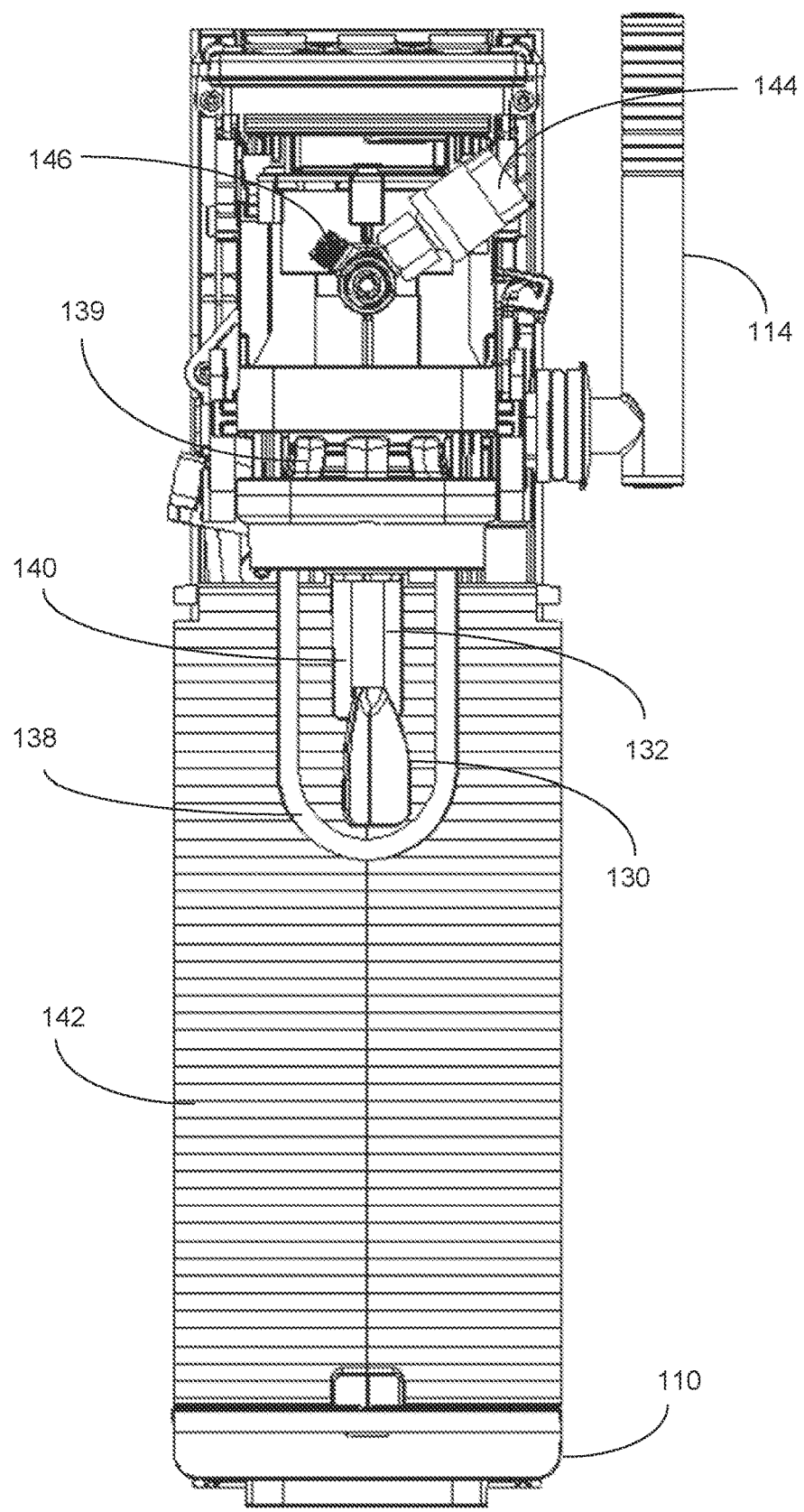
FIG. 5 is a frontal view of the carbonation machine of FIG. 1, showing the stirrer and a surplus reservoir panel.

Carbonation machine 100 generally includes housing 102 with a carbonation head compartment 106 that houses a carbonation head mount 139a (see FIG. 2), to which a bottle 112 may be sealingly coupled, e.g., using one or more gaskets and carefully designing the carbonation head mount, for example using a pronged clamp 139 which is actuated by pronged clamp lever 138, see FIG. 5, so as to introduce, through piping of the carbonation head, and compress carbon dioxide into a space within the bottle 112 above the top surface of the liquid inside the bottle to carbonate that liquid.

Housing 102 also includes gas canister compartment 104, for housing a gas canister 116 filled with carbon dioxide, which is connected to the carbonation machine piping using a connector 122 (for example, a quick connector), to which the gas canister valve 120 is coupled. In some embodiments of the present invention, the gas canister 120 may be raised by a raising mechanism to engage with connector 122, for example, using raising lever 118.

In some embodiments of the present invention, the carbonation process is carried our automatically. In some other embodiments of the present invention, the carbonation process may be carried our manually.

In some embodiments of the invention, a user may fill a bottle 112 with liquid to be carbonated up to a top level (which may be marked, for example, on the bottle), leaving some space at the top of the bottle, and attach bottle 112 to the carbonation head 101 of the carbonation machine 100, maintaining the bottle 112 suspended over base 110 of the carbonation machine 100. The user then may move to any position between a closed position and an open position and vice versa, by turning pinch valve lever 114 to the closed position (e.g., to assume a horizontal orientation) to shut off a drain tube that is fluidically linked to the inside of bottle 112 and to the open position (e.g., to assume a vertical orientation) to open the drain tube, or to any intermediate position therebetween, to control the drainage in an analog manner. Further explanation is provided hereinafter, see also FIG. 6, FIG. 7. FIG. 8A and FIG. 8B and corresponding description parts in the specification.

After turning pinch valve lever to the closed position the user may select a desired carbonation level (e.g., low, medium, high) by pressing the appropriate carbonation actuation button 108, which activates the carbonation process. A controller actuates a piston that causes carbon dioxide to be released from the gas cylinder and flow through designated piping into the bottle and be compressed in the space above the liquid top surface level.

Figure 4:
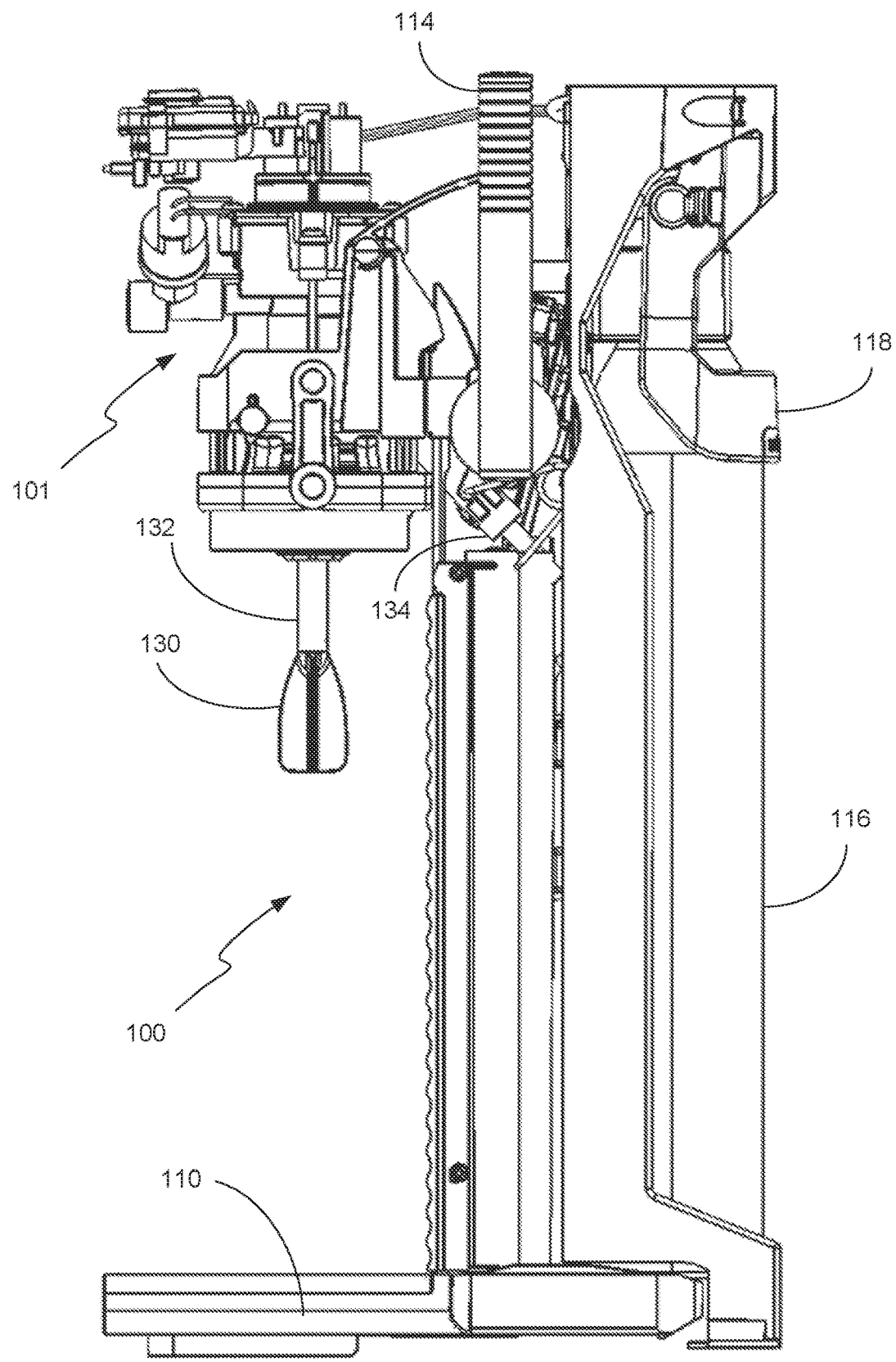
FIG. 4 is a side view of the carbonation machine of FIG. 1, showing parts of the carbonation head with a stirrer.

FIG. 4 is a side view of the carbonation machine of FIG. 1, showing parts of the carbonation head with a stirrer 130. During the introduction of carbon dioxide into the internal top space of the bottle 112, via a conduit in stirrer shaft 132, stirrer 130 is activated to stir the liquid and enhance absorption of carbon-dioxide in the liquid to be carbonated. The combined operation of flowing carbon dioxide from the gas canister into the bottle 112 and rapidly rotating the stirrer 130 may be carried out continuously or intermittently (e.g., in cycles) in a predetermined manner. When the carbonation process is finished (e.g., after a predetermined time has passed or a predetermined number of carbonation cycles was concluded), and before removing the bottle form the carbonation head, the user may turn the pinch valve lever 114 to the open position (e.g., in the vertical orientation) to allow excess compressed carbon dioxide to be vented out through the drain tube. The user has a complete control of the pinch valve and may stop the venting at any time, for example if froth starts spilling out or for any other reason, and allow any residual froth inside the bottle to subdue before turning pinch valve lever 114 to an open position again.

FIG. 5 is a frontal view of the carbonation machine of FIG. 1, showing the stirrer and a surplus reservoir panel.

Figure 6:
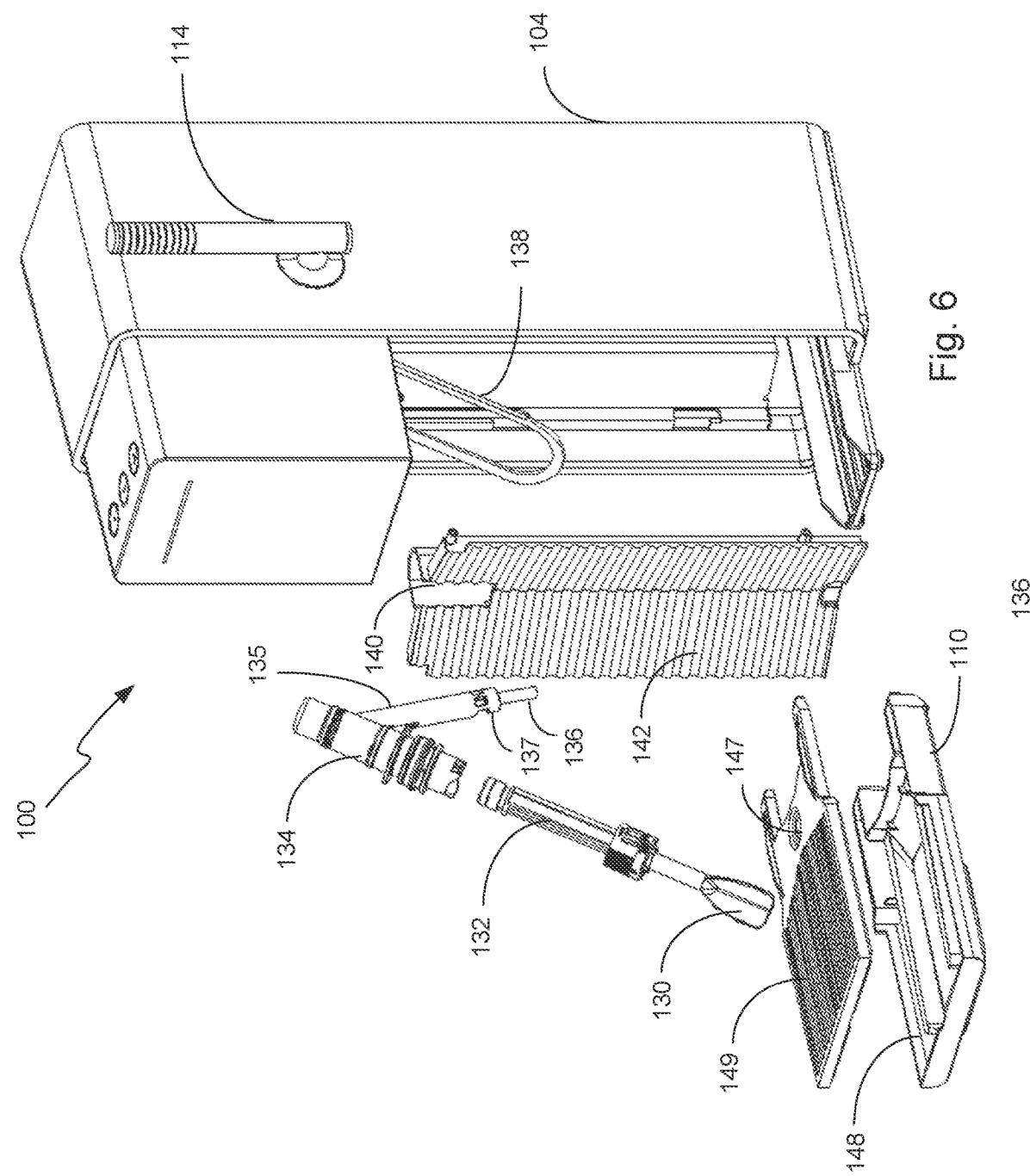
FIG. 6 is an exploded view of parts of the carbonation machine of FIG. 1.

FIG. 6 is an exploded view of parts of the carbonation machine of FIG. 1.

The surplus reservoir is configured to receive and hold any undesired fluid or froth that may flow out of the bottle through the drain tube. A surplus reservoir conduit 140 is generally concealed behind surplus reservoir panel 142 and extends behind the panel down to drip tray opening 147 of drip tray grille 149 of drip tray 148. Any fluid or froth that leaks through the drain tube is collected and retained in the basin of drip tray 148. The parts shown in FIG. 6 that come in direct contact with the carbonated liquid-stirrer shaft 132 with stirrer 130, stirrer housing 134 with drain tube 136 and drain tube sleeve 135, surplus reservoir panel 142 with surplus reservoir conduit 140, drip tray 148 and drip tray grille 149—as well as the bottle, are all detachable and may be washed and dried before placing them back. The length of stirrer shaft 132 is configured to be long enough to maintain the stirrer 130 under the top surface level of the liquid inside the bottle, when the bottle is attached to the carbonation head.

Figure 7A:
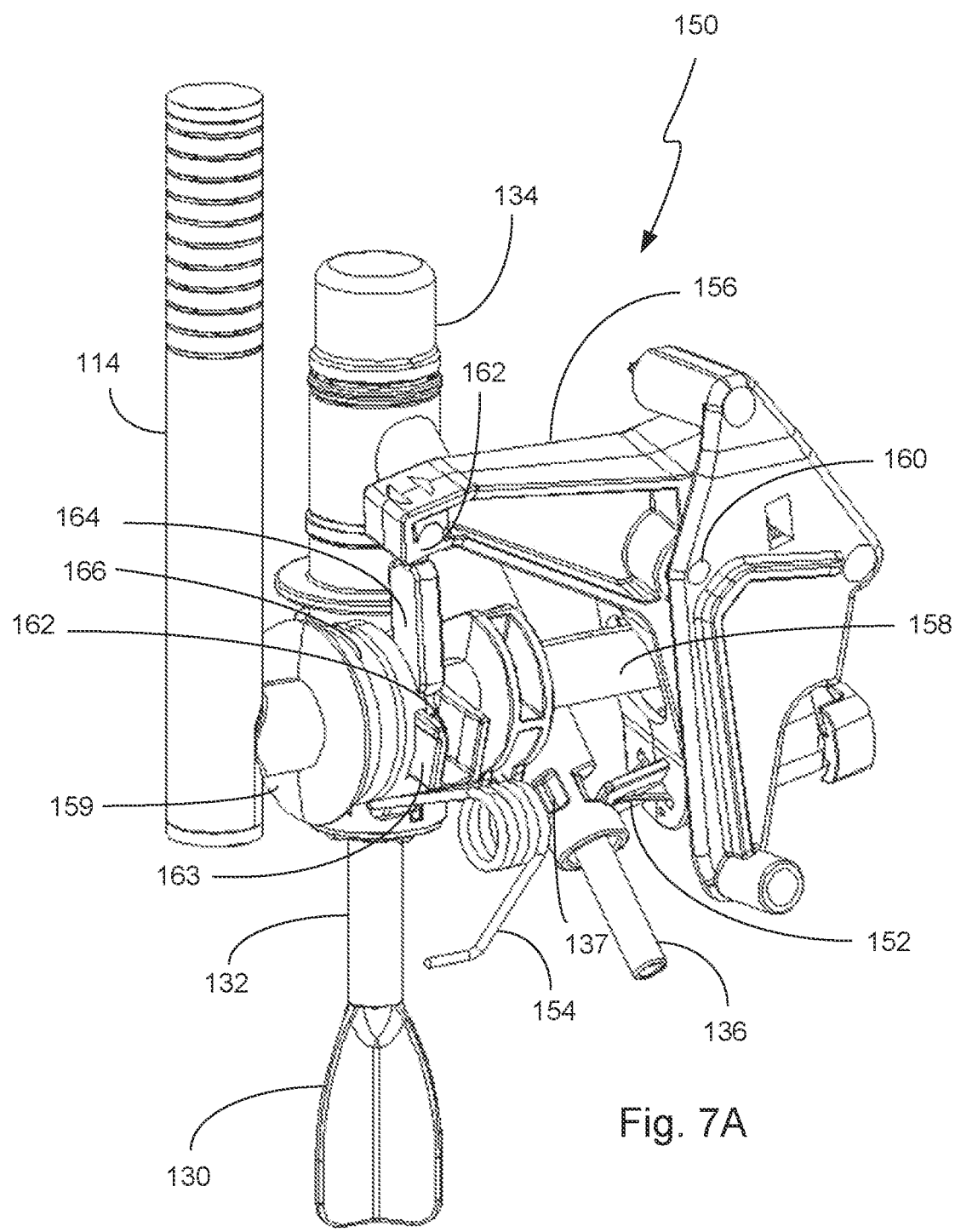
FIG. 7A shows a pinch valve mechanism of a carbonation machine according to some embodiments of the present invention.

FIG. 7A shows a pinch valve mechanism 150 of a carbonation machine according to some embodiments of the present invention.

Figure 7B:
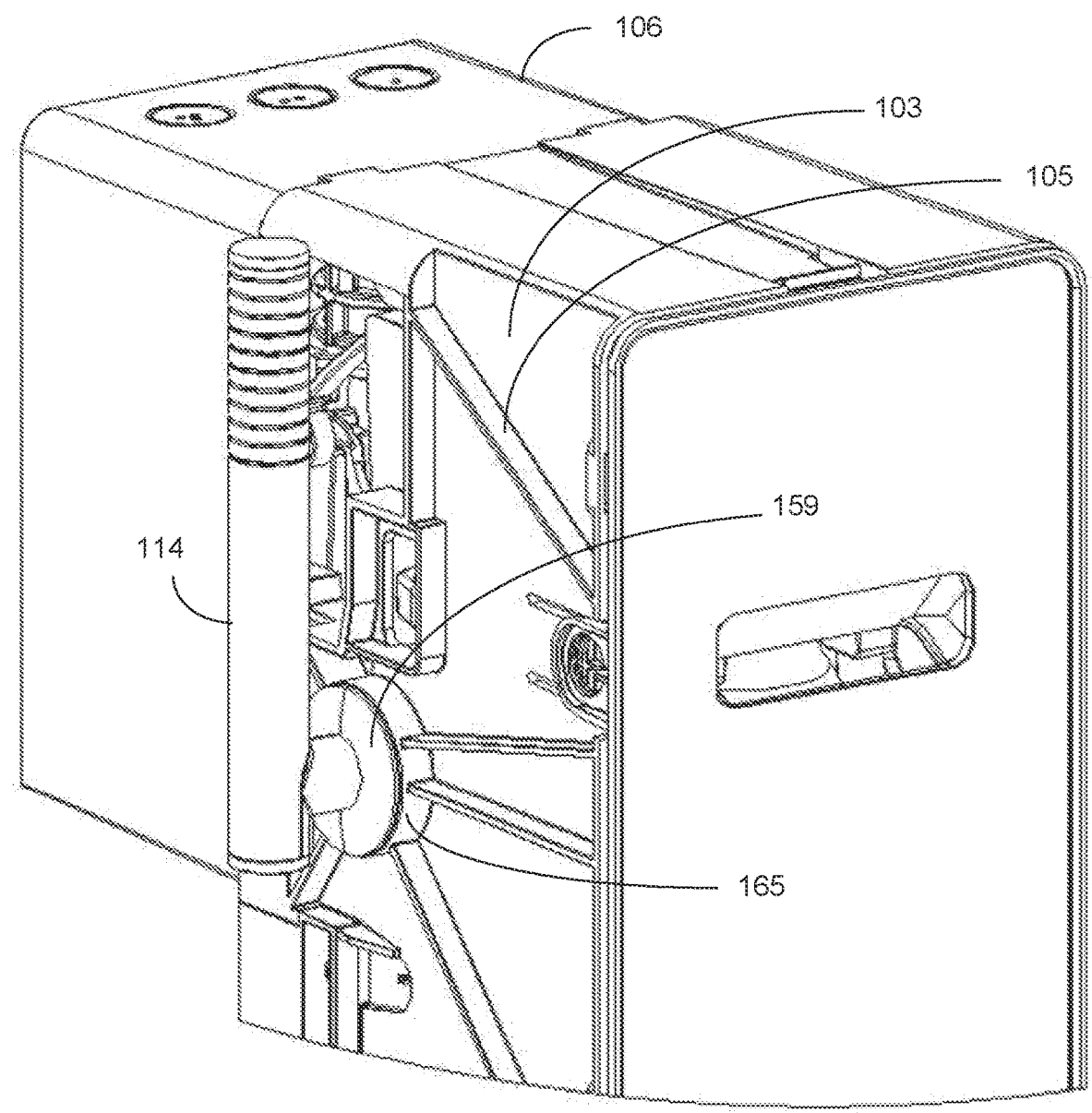
FIG. 7B shows a side-wall panel of a carbonation machine with a ring that supports an axle of the pinch valve mechanism of FIG. 7A.

FIG. 7B shows a side-wall panel 103 of a carbonation machine with a ring 165 that supports wheel 159 of axle 158 of the pinch valve mechanism of FIG. 7A. Ribs 105 may be provided on side-wall panel 103 for reinforcement. Wheel 159 may be fitted with a friction generator, e.g., an O-ring 166, to generate friction with ring 165 when lever 114 is rotated, so as to allow rotating lever 114 to any position between the two end positions and releasing the lever, maintaining the lever and the pinch valve in that position, thereby allowing analog regulation of the pinch valve mechanism and consequently analog regulation of pressure release and flow through drain tube 132.

FIG. 8A shows the pinch valve mechanism of FIG. 7 with the drain tube open.

FIG. 8B shows the pinch valve mechanism of FIG. 7 with the drain tube closed.

The pinch valve mechanism 150 is configured to allow the user full control over the decompression of the carbon dioxide inside the carbonation bottle 112 prior to removing the bottle from the carbonation head. Pinch valve mechanism 150 generally includes a user operated pinch valve lever 114 which is linked via a transmission to a pincher, e.g., pinch bumper 152, such that when pinch valve lever 114 is moved to an "open" position (e.g., in a vertical orientation), pinch bumper 152 is retracted away from drain tube 136, allowing free flow within the drain tube, and when pinch valve lever 114 is moved to a "closed" position (e.g., in a horizontal orientation), pinch bumper 152 advances to drain tube 136 and pinches drain tube 136, which is made of an elastic material (e.g., silicone) to block the tube and prevent flow within the tube.

In order to obtain effective blockage of drain tube 136 a transmission including wheels and levers is provided, as shown in FIGS. 7, 8A and 8B. Pinch valve lever 114 is substantially orthogonally coupled to rotatable axle 158. Offset cantilever 163 extends radially from axle 158 and serves as a receptacle holder of a ball joint link 162 at one end of bar 164. Bar 164 has on the opposite end another ball joint link 162 held by a corresponding receptacle holder at an end of seesaw arm 156, which is pivotally supported by axis mount 160. Seesaw arm 156 has at an opposite end bumper receptacle 151 which contains pinch bumper 152, in a default extended outwards position, facilitated by preloaded bumper spring 153.

Drain tube 136 extends inside sleeve 135 and includes one or more apertures 137 through which a blade 155 of bumper 152 may enter and press drain tube 136 against an opposite internal wall of sleeve 135 for effectively blocking drain tube 136.

When pinch valve lever 114 is rotated to the open position, as illustrated in FIG. 8A, offset cantilever 163 is aligned horizontally with axle 158 causing bumper 152 at the opposite end of seesaw arm 156 to be rotated away from drain tube 136, allowing flow through the tube. When pinch valve lever 114 is rotated to the closed position, as illustrated in FIG. 8B, offset cantilever 163 is raised above axle 158 causing bumper 152 at the opposite end of seesaw arm 156 to be pressed onto drain tube 136 to block the tube.

Over-center spring 154 may be provided, to enhance the use of the pinch valve mechanism 150. Over-center spring 154 may be designed and positioned such that when the pinch valve mechanism 150 (as is lever 114) approaches close either to the closed position or the open position, spring 154 exerts a stronger rotary force on axle 158 of the pinch valve mechanism 150, so as to force the axle to complete its rotation to the nearest end position, to affect either the closed or the open position.

Pinch valve lever 114, according to some embodiments of the present invention, is designed to perform several tasks. When pinch valve lever 114 is fully rotated to a first end position-fully opened position-along the allowed movement of the lever, e.g., in the upright position, the user may insert the neck of the bottle 112 with the liquid for carbonation into the carbonation head mount 139*a* to start a carbonation process, or remove the bottle after carbonation. When pinch valve lever 114 is in the opposite position —fully rotated to the other end of the allowed movement (for example, to a horizontal position) to a fully closed position, the pronged clamp 139 is locked so as to hold the neck of bottle 112 in the carbonation head mount 139*a*. When in the locked position bottle 112 cannot be removed from carbonation head mount 139*a*, and carbonation may commence, with carbon dioxide being introduced into the space above the liquid level inside the bottle. When carbonation is completed, the user may slightly rotate pinch valve lever 114 to gradually retract blade 155 of pinch bumper 152 of pinch valve mechanism 150 and carefully release excess pressure from the bottle through drain tube 136. If the user notices a sudden rise of froth inside bottle 112, the user may reverse pinch valve lever 114 to block drain tube 136 or to slow down the pressure release through that pipe by pressing pressure of blade 155 against drain tube 136. When the froth buildup inside bottle 112 subsides pinch valve lever 114 may be turned towards the open position allowing gas to escape through drain tube 136.

Preloaded spring 153 that presses out pinch bumper 152 may be designed (e.g., by selecting a proper spring coefficient) to act as a safety spring, by yielding to overpressure over a predetermined overpressure threshold that may build up inside bottle 112, causing blade 155 of pinch bumper 152 to retract from fully pinching of drain tube 136 and allowing overpressure to be released.

According to some embodiments of the present invention, all parts of the carbonation machine that are designed to be placed in contact with the liquid are removable, may be dismantled and washed (e.g., in a dishwasher).

Figure 9:
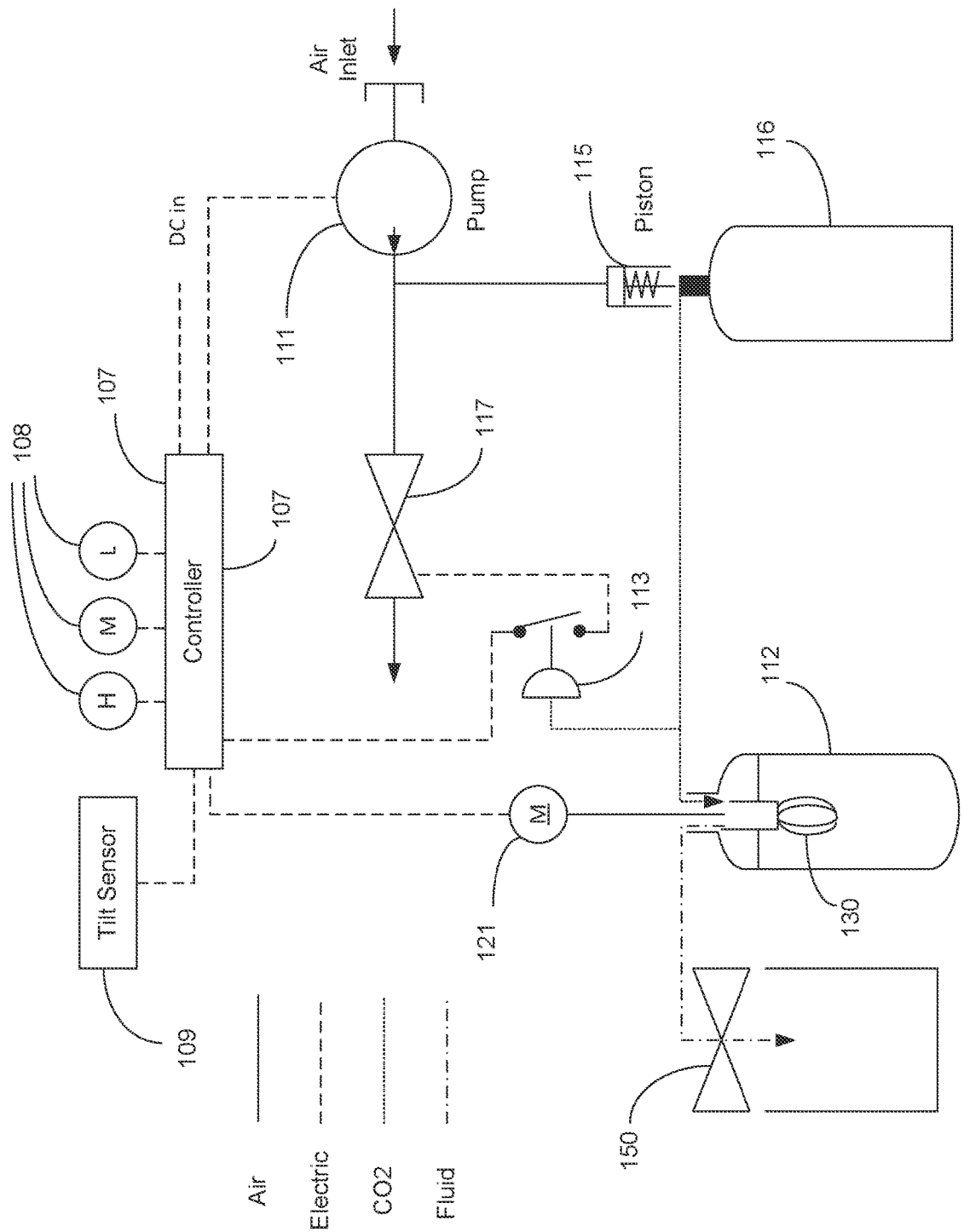
FIG. 9 is a schematic operational diagram of a carbonation machine, according to some embodiments of the present invention.

FIG. 9 is a schematic operational diagram of a carbonation machine, according to some embodiments of the present invention.

After attaching the carbonation bottle 112 filled with liquid to be carbonated up to a predetermined level, tilt sensor 109 is used to verify that the bottle is properly placed. The user then selects the desired carbonation level by pressing on any of the carbonation actuation buttons (e.g., H-high, M-medium, L-low). Pump 111 is then activated to actuate piston 115 to release carbon dioxide from gas canister 116, which flows into the space above the liquid top surface level in bottle 112. Stirrer 130 may be electrically operated, e.g., electrical motor 121 may be provided to rotate stirrer 130 to increase absorption of carbon dioxide in the liquid inside the bottle. Pressure sensor 113 is used to sense and determine whether the pressure level inside the bottle exceeds a predetermined threshold (e.g., 6 bars). If the sensor 113 senses that pressure within the bottle exceeds the predetermined threshold, controller 107 activates solenoid 117 to cause piston 115 to disengage from the valve of gas canister 116 to stop additional carbon dioxide from flowing into the bottle 112. According to embodiments of the invention, when the pressure above the liquid drops below a threshold level due to absorption into the water, the controller 107 may be configured to activate piston 115 allowing more gas to flow into the bottle.

When the carbonation process is completed the user may operate pinch valve lever 114 and release any residual pressure within bottle 112 before removing the bottle from the carbonation machine.

Following is an index of elements shown in the figures:
- 100—carbonation machine;
- 101—carbonation head;
- 102—housing;
- 103—side-wall panel;
- 104—gas canister compartment;
- 105—reinforcement rib;
- 106—carbonation head compartment;
- 107—controller;
- 108—carbonation actuation buttons;
- 109—tilt sensor;
- 110—base;
- 111—pump;
- 112—bottle;
- 113—pressure sensor;
- 114—pinch valve lever;
- 115—piston;
- 116—gas canister;
- 117—solenoid;
- 118—raising lever;
- 119—stirrer motor;
- 120—gas canister valve;
- 121—motor;
- 122—connector;
- 130—stirrer;
- 132—stirrer shaft;

134—stirrer housing;
135—sleeve;
136—drain tube;
137—aperture;
138—pronged clamp lever;
139—pronged clamp;
139a—carbonation head mount;
140—surplus reservoir conduit;
142—surplus reservoir panel;
144—pressure switch;
146—CO2 inlet;
147—drip tray opening;
148—drip tray;
149—drip tray grille;
150—pinch valve mechanism;
151—bumper receptacle;
152—pinch bumper;
153—preloaded bumper spring;
154—over-center spring;
155—bumper blade;
156—seesaw arm;
158—axle;
159—wheel;
160—axis mount;
162—ball joint link;
163—offset cantilever;
164—bar;
165—ring;
166—O-ring.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A carbonation machine comprising:
a carbonation head to sealingly couple to a bottle filled with liquid to be carbonated;
a piping to transfer carbon dioxide into a space within the bottle above a top surface of the liquid to a predetermined pressure level when the bottle is coupled to the carbonation head;
a stirrer to stir the liquid to enhance absorption of carbon dioxide in the liquid when the bottle is coupled to the carbonation head; and
a manually operated valve mechanism configured to be moved to any position between a closed position to an open position for user-controlled release of pressure within the space.

2. The carbonation machine of claim 1, wherein the manually operated valve mechanism comprises a pinch valve mechanism.

3. The carbonation machine of claim 2, wherein the pinch valve mechanism comprises a pinch bumper to pinch a drain tube to prevent flow through the drain tube when in the closed position, and to retract from the drain tube to allow flow through the drain tube to release pressure inside the bottle.

4. The carbonation machine of claim 3, wherein the pinch valve mechanism is configured to allow gradual retracting of the pinch bumper to release pressure through the drain tube.

5. The carbonation machine of claim 3, wherein the pinch bumper is held at an end of a seesaw arm pivotally supported by an axis mount.

6. The carbonation machine of claim 5, wherein the pinch bumper is held by a receptacle.

7. The carbonation machine of claim 6, wherein the pinch bumper is maintained in a default extended outwards position.

8. The carbonation machine of claim 7, wherein the pinch bumper is maintained in a default extended outwards position by a preloaded spring.

9. The carbonation machine of claim 8, wherein the preloaded spring is configured to yield to overpressure buildup inside the bottle above a predetermined overpressure threshold.

10. The carbonation machine of claim 3, wherein the pinch valve mechanism includes a friction generator to generate friction so as to allow manually operating the manually operated valve mechanism to any position between the closed position and the open position and maintaining that position even when the manually operated valve mechanism is released.

11. The carbonation machine of claim 2, wherein the pinch valve mechanism is operable by a pinch valve lever.

12. The carbonation machine of claim 11, wherein the pinch valve lever is substantially orthogonally coupled to a rotatable axle.

13. The carbonation machine of claim 12, wherein the pinch valve mechanism comprises an over-center spring positioned such that when the pinch valve mechanism approaches either the closed position or the open position, the over-center spring exerts a rotary force on an axle of the pinch valve mechanism so as to force the axle to rotate to a nearest end position, to affect either the closed position or the open position.

14. The carbonation machine of claim 1, wherein the stirrer is electrically operated.

15. The carbonation machine of claim 1, wherein the carbonation head is configured to compress the carbon dioxide in the space up to a pressure threshold.

16. The carbonation machine of claim 15, wherein the pressure threshold is 10 bars.

17. The carbonation machine of claim 15, wherein the pressure threshold is 6 bars.

18. The carbonation machine of claim 1, wherein parts of the machine that are designed to be placed in contact with the liquid are removable.

19. The carbonation machine of claim 1, further comprising a controller, configured to cause carbon dioxide to be added to the space within the bottle above the top surface of the liquid when pressure in the bottle drops below a predetermined pressure threshold.

* * * * *